US010055489B2

(12) United States Patent
Haviv et al.

(10) Patent No.: US 10,055,489 B2
(45) Date of Patent: Aug. 21, 2018

(54) SYSTEM AND METHOD FOR CONTENT-BASED MEDIA ANALYSIS

(71) Applicant: eBay Inc., San Jose, CA (US)

(72) Inventors: Adi Guila Haviv, New York, NY (US); Benjamin Eliot Klein, Princeton, NJ (US); Krutika Shetty, New York, NY (US)

(73) Assignee: eBay Inc., San Jose, CA (US)

( * ) Notice: Subject to any disclaimer, the term of this patent is extended or adjusted under 35 U.S.C. 154(b) by 356 days.

(21) Appl. No.: 15/057,024

(22) Filed: Feb. 29, 2016

(65) Prior Publication Data
US 2017/0228382 A1 Aug. 10, 2017

Related U.S. Application Data

(60) Provisional application No. 62/292,753, filed on Feb. 8, 2016.

(51) Int. Cl.
*G06F 17/30* (2006.01)
*G06Q 30/06* (2012.01)
*G06N 3/08* (2006.01)

(52) U.S. Cl.
CPC ...... *G06F 17/3071* (2013.01); *G06N 3/08* (2013.01); *G06Q 30/0631* (2013.01)

(58) Field of Classification Search
CPC ... G06F 17/3071; G06Q 30/0631; G06N 3/08
USPC .......................................... 707/739
See application file for complete search history.

(56) References Cited

U.S. PATENT DOCUMENTS 5,317,507 A * 5/1994 Gallant ............... G06F 17/274
707/E17.07
5,325,298 A * 6/1994 Gallant ............... G06F 17/274
704/9

(Continued)

FOREIGN PATENT DOCUMENTS

CN 104286200 A 1/2015
WO WO -02100104 A2 * 12/2002 ............ H04N 7/163

OTHER PUBLICATIONS

Levy, O., et al., "Neural Word Embedding as Implicit Matrix Factorization", Advances in Neural Information Processing Systems 27. Curran Associates, Inc., (2014), 2177-2185.

(Continued)

Primary Examiner — Phuong Thao Cao
(74) Attorney, Agent, or Firm — Shook, Hardy & Bacon L.L.P.

(57) ABSTRACT

A media analysis system includes one or more hardware processors, a memory storing synopses associated with catalog books, and a content analysis engine. The content analysis engine generates a media vector for each catalog book based on the associated synopsis by generating a word vector for each word in the synopsis, combining the plurality of word vectors into a mean vector for the catalog book, and storing the mean vector as the media vector associated with the catalog book. The content analysis engine also identifies a target book associated with a seed media vector, determines R nearest neighbors for the target book from the plurality of catalog books based on (1) the seed media vector and (2) the media vectors associated with the plurality of catalog books, clusters the R nearest neighbors into K clusters, and selects catalog books for recommendation to a user based on the K clusters.

20 Claims, 7 Drawing Sheets

(56) References Cited

U.S. PATENT DOCUMENTS

| | | | | |
|---|---|---|---|---|
| 5,832,470 | A * | 11/1998 | Morita | G06F 17/3071 |
| 6,560,597 | B1 * | 5/2003 | Dhillon | G06F 17/3071 |
| 7,778,819 | B2 * | 8/2010 | Bellegarda | G10L 13/033 |
| | | | | 704/257 |
| 8,073,871 | B2 * | 12/2011 | Gutta | H04N 7/163 |
| | | | | 707/791 |
| 9,116,995 | B2 * | 8/2015 | Koperski | G06F 17/30663 |
| 9,189,740 | B1 * | 11/2015 | Emigh | G06N 5/045 |
| 9,213,997 | B2 * | 12/2015 | Chatterjee | G06Q 50/01 |
| 9,589,237 | B1 * | 3/2017 | Qamar | G06N 99/005 |
| 9,672,207 | B2 * | 6/2017 | Shmueli | G06F 17/2785 |
| 9,842,110 | B2 * | 12/2017 | Braziunas | G06F 17/30011 |
| 9,904,949 | B1 * | 2/2018 | Tavernier | G06Q 30/0631 |
| 2003/0014404 | A1 * | 1/2003 | Gutta | H04N 7/163 |
| 2005/0123053 | A1 * | 6/2005 | Cooper | G11B 27/28 |
| | | | | 375/240.24 |
| 2007/0143279 | A1 * | 6/2007 | Yao | G06F 17/30864 |
| 2007/0226207 | A1 * | 9/2007 | Tawde | G06F 17/3071 |
| 2007/0244874 | A1 * | 10/2007 | Tawde | G06F 17/3071 |
| 2009/0248678 | A1 * | 10/2009 | Okamoto | G06F 17/3071 |
| 2009/0319883 | A1 * | 12/2009 | Mei | G06F 17/30781 |
| | | | | 715/230 |
| 2010/0100547 | A1 * | 4/2010 | Ulmer | G06F 17/241 |
| | | | | 707/739 |
| 2013/0124536 | A1 * | 5/2013 | Miyahara | G06F 17/30867 |
| | | | | 707/748 |
| 2013/0166561 | A1 * | 6/2013 | Georgescu | G06F 17/30817 |
| | | | | 707/739 |
| 2013/0346385 | A1 * | 12/2013 | Kraftsow | G06F 17/30867 |
| | | | | 707/708 |
| 2014/0114978 | A1 * | 4/2014 | Chatterjee | G06Q 10/107 |
| | | | | 707/739 |
| 2014/0129561 | A1 * | 5/2014 | Kern | G06F 17/30598 |
| | | | | 707/740 |
| 2015/0154497 | A1 * | 6/2015 | Braziunas | G06F 17/30011 |
| | | | | 706/12 |
| 2015/0339288 | A1 * | 11/2015 | Baker | G06F 17/2705 |
| | | | | 704/9 |
| 2016/0104074 | A1 * | 4/2016 | Shekhawat | G06F 17/30705 |
| | | | | 706/12 |
| 2017/0109344 | A1 * | 4/2017 | Shmueli | G10L 15/1815 |
| 2017/0161275 | A1 * | 6/2017 | Speer | G06F 17/3043 |
| 2017/0169011 | A1 * | 6/2017 | Shmueli | G06F 17/2785 |
| 2017/0178023 | A1 * | 6/2017 | Green | G06N 99/005 |
| 2017/0185581 | A1 * | 6/2017 | Bojja | G06F 17/276 |
| 2017/0206416 | A1 * | 7/2017 | Chen | G06K 9/00671 |
| 2017/0207980 | A1 * | 7/2017 | Hudis | H04L 41/145 |
| 2017/0213138 | A1 * | 7/2017 | Bojja | G06N 5/04 |
| 2017/0228382 | A1 * | 8/2017 | Haviv | G06N 3/08 |

OTHER PUBLICATIONS

Bansal, Mohit, et al., "Tailoring Continuous Word Representations for Dependency Parsing", Proceedings of the 52nd Annual Meeting of the Association for Computational Linguistics, (2014), 809-815.
Bell, S, et al., "Learning visual similarity for product design with convolutional neural networks", ACM Transactions on Graphics. 34(4), (2015), 98(1)-98(10).
Bordes, N, et al., "Translating Embeddings for Modeling Multi-relational Data", Advances in Neural Information Processing Systems, (2013), 2787-2795.
Chatfield, Ken, et al., "Return of the Devil in the Details: Delving Deep into Convolutional Nets", British Machine Vision Conference, (2014), 12 pgs.
Datar, Mayur, et al., "Locality-Sensitive Hashing Scheme Based on p-Stable Distributions", SoCG '04, (2004), 253-262.
Deng, J., et al., "ImageNet: A large-scale hierarchical image database", IEEE Conference on Computer Vision and Pattern Recognition, 2009. CVPR 2009., (2009), 248-255.
Girshick, Ross, et al., "Rich Feature Hierarchies for Accurate Object Detection and Semantic Segmentation", The IEEE Conference on Computer Vision and Pattern Recognition, (2014), 580-587.
Jegou, Herve, et al., "Aggregating Local Descriptors into a Compact Image Representation", IEEE, (2010), 3304-3311.
Jegou, Herve, et al., "Product Quantization for Nearest Neighbor Search", IEEE Transactions on Pattern Analysis and Machine Intelligence, 33(1), (2011), 117-128.
Jia, Y., et al., "Caffe: Convolutional architecture for fast feature embedding.", ACM, (2014).
Jing, Y., et al., "Visual Search at Pinterest", In Proceedings of the 21th ACM SIGKDD International Conference on Knowledge Discovery and Data Mining, (2015), 1889-1898.
Kiapour, M Hadi, et al., "Where to Buy It: Matching Street Clothing Photos in Online Shops", The IEEE International Conference on Computer Vision, (2015), 3343-3351.
Klein, Benjamin, et al., "Associating Neural Word Embeddings With Deep Image Representations Using Fisher Vectors", IEEE Conference on Computer Vision and Pattern Recognition, (2015), 4437-4446.
Koren, Y., et al., "Matrix factorization techniques for recommender systems.", Computer, (8), (2009), 30-37.
Le, Quoc, "Distributed Representations of Sentences and Documents", JMLR: W&CP vol. 32. arXiv preprint arXiv:1405.4053, (2014), 9 pgs.
Lecun, Yann, et al., "Gradient-Based Learning Applied to Document Recognition", Proc. of the IEEE, (Nov. 1998), 2278-2324.
Lev, Guy, et al., "In Defense of Word Embedding for Generic Text Representation", Natural Language Processing and Information Systems. vol. 9103 of the series Lecture Notes in Computer Science, (Jun. 4, 2015), 35-50.
Lynch, Corey, et al., "Images don't lie: Transferring Deep Visual Semantic Features to Large-Scale Multimodal Learning to Rank", Xiv: 1511.06746, (2015), 9 pgs.
Mikolov, Tomas, et al., "Distributed Representations of Words and Phrases and Their Compositionality", arXiv: 1310.4546v1, (2013), 3111-3119.
Pennington, Jeffrey, et al., "GloVe: Global Vectors for Word Representation", (2014). 12 pgs.
Perronnin, F., et al., "Improving the Fisher kernel for large-scale image classication", Computer Vision-ECCV; Springer, (2010), 143-156.
Razavian, A., et al., "CNN features off the shelf: an astounding baseline .For recognition.", In Proceedings of the IEEE Conference on Computer Vision and Pattern Recognition Workshops, (2014), 806-813.
Simonyan, K., et al., "Very deep convolutional networks for large-scale image recognition.", arXiv:1409.1556, (2014), 1-10.
Szegedy, C., et al., "Going deeper with convolutions.", Proceedings of the IEEE Conference on Computer Vision and Pattern Recognition, (2015), 1-9.
Veit, A., et al., "Learning visual clothing style with heterogeneous dyadic co-occurrences.", Proceedings of the IEEE International Conference on Computer Vision, (2015), 1-9.
Yosinski, J., et al., "How transferable are features in deep neural networks?", Advances in Neural Information Processing Systems, (2014), 1-9.

* cited by examiner

SYSTEM AND METHOD FOR CONTENT-BASED MEDIA ANALYSIS

RELATED APPLICATIONS

This application claims the benefit of priority to U.S. Provisional Patent Application Ser. No. 62/292,753, filed Feb. 8, 2016, herein incorporated by reference in its entirety.

TECHNICAL FIELD

Embodiments of the present disclosure relate generally to data processing and, more particularly, but not by way of limitation, to systems and methods for content-based analysis of media.

BACKGROUND

Some online e-commerce systems (e.g., managing e-commerce sites) allow sellers to offer media such as books or movies for sale. To improve consumer experiences, some online e-commerce systems provide product recommendations to buyers. One known method of generating recommendations for buyers is through "collaborative filtering," which includes generating product recommendations based on some known interest of a target user (e.g., a product recently purchased by the target user) as compared to known data from other users (e.g., product purchase data from other users that purchased the same product). However, in some situations, there may not be enough data about the product, the target user, or other users for known collaborative filtering methods to perform sufficiently. Further, collaborative filtering performs poorly with cross-category recommendations.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used. Like numbers in the Figures indicate like components.

DETAILED DESCRIPTION

Figure 1:
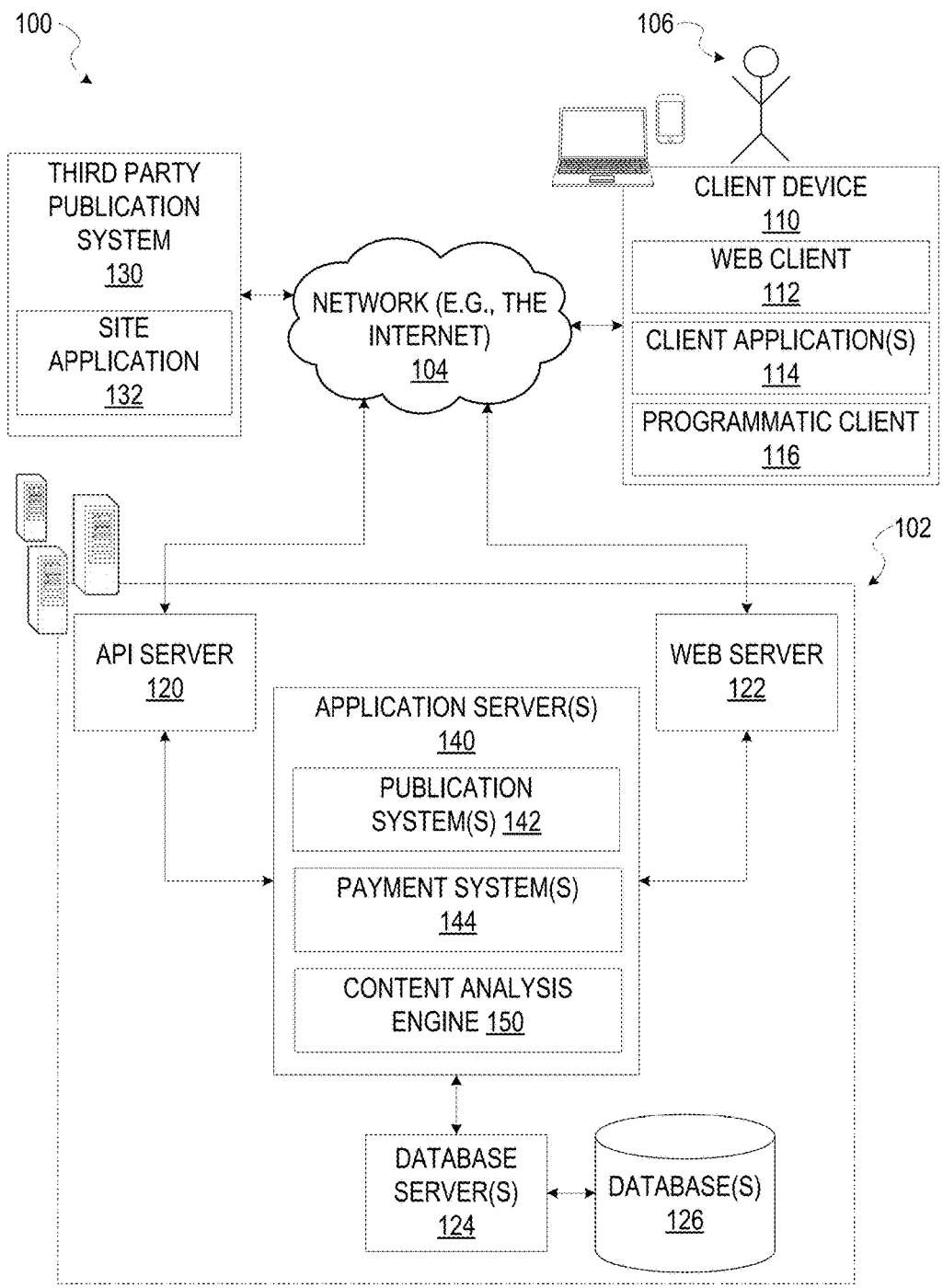
FIG. 1 is a network diagram depicting an example online e-commerce system.

The description that follows includes systems, methods, techniques, instruction sequences, and computing machine program products that describe illustrative embodiments of the disclosure. Numerous specific details are set forth herein in order to provide an understanding of various embodiments of the present subject matter. It will be evident, however, to those skilled in the art, that embodiments of the present subject matter may be practiced without these specific details. In general, well-known instruction instances, protocols, structures, and techniques are not necessarily shown in detail.

A content analysis engine is described herein for providing content-based analysis of media products, such as books or movies offered for sale in an online e-commerce system. In some scenarios, the online e-commerce system has sparse or non-existent purchase data for some media products. For example, a newly released movie or an uncommon (e.g., low-selling) book may have generated little or no prior purchases through the online e-commerce system and, as a result, there may not be enough purchase history for the media product sufficient to generate a satisfactory product recommendation using other methods reliant on such data. To avoid problems with scarce purchase data, the content analysis engine and methods described herein provide content-based analysis and recommendations for media products.

In various example embodiments, the media products offered for sale by the online e-commerce system, and analyzed by the content analysis engine, include a synopsis (e.g., a product synopsis stored as metadata associated with the media product). The synopsis of a book, for example, may include summary text describing the subject matter of the book. The content analysis engine performs content analysis of the media product using the synopsis. More specifically, in one example embodiment, the content analysis engine performs vectorization of each of the words of the synopsis using word embedding techniques (e.g., neural language models for semantic embedding of words in vector spaces, such as with word2vec). Each word of the synopsis is converted into its own word vector. The content analysis engine then combines the word vectors for the synopsis words to generate a media vector (e.g., a combined vector for the synopsis). Accordingly, the media vector is a vectorized representation of the content of the book, via the content of the synopsis.

Similarly, the content analysis engine generates media vectors for each media item in a pool of media (e.g., a catalog of books of the online e-commerce system). Once media vectors have been created for the pool of media, the content analysis engine uses the media vectors to generate one or more media recommendations for users of the online e-commerce system. For example, presume a purchaser buys a book of interest ("seed media") through the online e-commerce system. The book of interest has an associated media vector (a "seed media vector"), computed as described above. The content analysis engine compares the seed media vector to the pool of media vectors to determine books similar to the book of interest. More specifically, the content analysis engine finds a set of nearest neighbors to the seed media based on the media vectors.

In some embodiments, once the pool of nearest neighbors has been identified, the pool of nearest neighbors is filtered by clustering the seed media and the set of nearest neighbors into a number of clusters. The media products to use as recommendations are selected based on the clusters. In some embodiments, no media item is selected from the cluster containing the seed media product. Some products may be so similar to the seed media product that they are undesirable as a recommendation to the user. For example, a particular book may have multiple versions, and a purchaser of one version is very unlikely to be interested in purchasing another version. Since the two versions of the book are very similar in content, their synopses may also be very similar or identical and, as such, may end up in the same cluster with the seed media product. Thus, providing recommendations from other clusters and not the cluster containing the seed media product reduces the likelihood of recommending undesired content to the user. Further, in some embodiments, only a predetermined number of media products are selected from each cluster (e.g., one media product from each cluster). Limiting the number of media products from each cluster reduces the likelihood that multiple very similar products are recommended to the user (e.g., two different versions of the same book).

In some embodiments, the content analysis engine may also cross-compare types of media. Since the content analysis engine provides a content-based approach, media of disparate types may be compared and recommended based on their synopses. For example, the content analysis engine may compute media vectors of both books and motion pictures. Subsequently, a purchaser may purchase a media product of one type (e.g., a movie about World War II) and the content analysis engine may compare that movie's vector to a pool of book vectors to generate book recommendations that focus on World War II. As such, this content-based approach can cross-recommend media to the user based on the user's interests.

FIG. 1 is a network diagram depicting an example online e-commerce system 100. In the example embodiment, the online e-commerce system 100 includes a networked system 102 that provides online services to online users, such as a user 106 via a client device 110. The networked system 102 includes a content analysis engine 150 for performing content-based analysis of media products, and other associated operations, as described herein.

The networked system 102 provides network-based, server-side functionality, via a network 104 (e.g., the Internet or a Wide Area Network (WAN)), to the client devices 110 that may be used, for example, by sellers or buyers (not separately shown) of products and services offered for sale through a publication system 142 (e.g., through an online marketplace system provided by the publication systems 142 or payment systems 144). FIG. 1 further illustrates, for example, one or more of a web client 112 (e.g., a web browser), client application(s) 114, and a programmatic client 116 executing on the client device 110.

Each of the client devices 110 comprises a computing device that includes at least a display and communication capabilities with the network 104 to access the networked system 102. The client device 110 includes devices such as, but not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client devices 110 connects with the network 104 via a wired or wireless connection. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 includes one or more client applications (also referred to as "apps") 114 such as, but not limited to, a web browser, a messaging application, an electronic mail (email) application, an e-commerce site application (also referred to as a marketplace application), and the like. In some embodiments, if the e-commerce site application is included in a given one of the client devices 110, then this application is configured to locally provide the user interface and at least some of the functionalities of an e-commerce site, with the application configured to communicate with the networked system 102, on an as-needed basis, for data or processing capabilities not locally available (e.g., such as access to a database of items available for sale, to authenticate a user, or to verify a method of payment). Conversely, if the e-commerce site application is not included in a given one of the client devices 110, the given one of the client devices 110 may use its web client 112 to access the e-commerce site (or a variant thereof) hosted on the networked system 102. Although only one client device 110 is shown in FIG. 1, two or more client devices 110 may be included in the online e-commerce system 100.

An Application Program Interface (API) server 120 and a web server 122 are coupled to, and provide programmatic and web interfaces respectively to, one or more application servers 140. In the example embodiment, the application servers 140 host the content analysis engine 150 that facilitates providing analysis and recommendation services, as described herein. The application servers 140 are, in turn, shown to be coupled to one or more database servers 124 that facilitate access to one or more databases 126.

In some embodiments, the application servers 140 host one or more publication systems 142 and payment systems 144. The publication system 142 may provide a number of e-commerce functions and services to users that access the networked system 102 or external sites (e.g., a third party publication system 130 executing a site application 132). E-commerce functions and services may include a number of publisher functions and services (e.g., search, listing, content viewing, payment, etc.). For example, the publication system 142 may provide a number of services and functions to users for listing or submitting offers for goods or services for sale, searching for goods and services, facilitating transactions, and reviewing and providing feedback about transactions and associated users. Additionally, the publication system 142 may track and store data and metadata relating to listings, transactions, and user interactions. In some embodiments, the publication system 142 may publish or otherwise provide access to content items stored in the application servers 140 or the databases 126 accessible to the application servers 140 or the database servers 124. The payment system 144 may likewise provide a number of payment services and functions to users. The payment system 144 may allow users to accumulate value (e.g., in a commercial currency, such as the U.S. dollar, or a proprietary currency, such as "points") in accounts, and then later to redeem the accumulated value for products or items (e.g., goods or services) that are made available via the publication system 142. While the publication system 142 and the payment system 144 are shown in FIG. 1 to both form part of the networked system 102, it will be appreciated that, in alternative embodiments, the payment system 144 may form part of a payment service that is separate and distinct from the networked system 102. In other embodiments, the payment system 144 may be omitted from the online e-commerce system 100. In some embodiments, at least a portion of the publication system 142 may be provided on the client devices 110.

Further, while the online e-commerce system 100 shown in FIG. 1 employs a client-server architecture, some example embodiments of the present disclosure are not limited to such an architecture, and may equally well find application in, for example, a distributed or peer-to-peer architecture system. The various publication and payment systems 142 and 144 may also be implemented as stand-alone software programs, which do not necessarily have networking capabilities.

The client devices 110 access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the TurboLister application developed by eBay Inc., of San Jose, Calif.) to enable sellers to author and manage listings on the networked system 102 in an offline manner, and to perform batch-mode communications between the programmatic client 116 and the networked system 102.

In the example embodiment, the content analysis engine 150 analyzes products associated with listings on the networked system 102. The online e-commerce system 100 may provide product or listing recommendations to users based on user interest, such as determined through online viewing, watching, or purchasing of products through the online e-commerce system 100.

Figure 2:
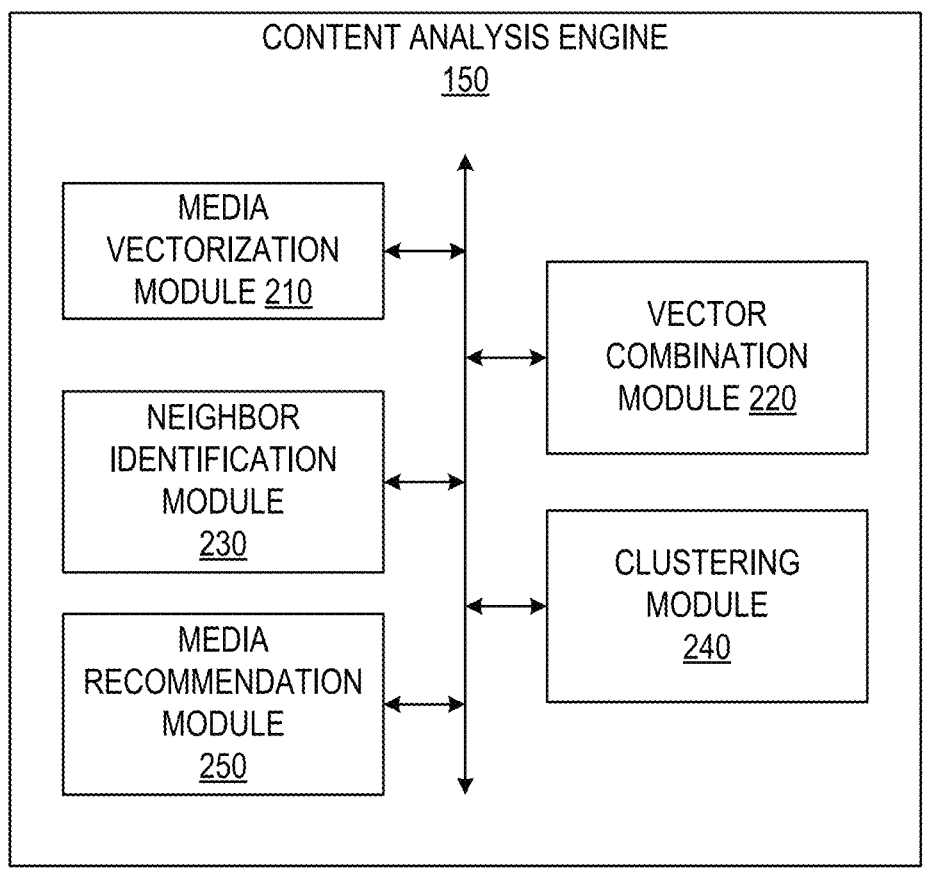
FIG. 2 is a block diagram showing components provided within the content analysis engine, according to some embodiments.

FIG. 2 is a block diagram showing components provided within the content analysis engine 150 according to some embodiments. The content analysis engine 150 may be hosted on dedicated or shared server machines (not shown) that are communicatively coupled to enable communications between the server machines. In some embodiments, components of the content analysis engine 150 may be executed on a graphics processing unit (GPU) such as, for example, one or more Titan X GPUs (such as those made commercially available by NVIDIA corporation, a California corporation, and other manufacturers). The components themselves are communicatively coupled (e.g., via appropriate interfaces) to each other and to various data sources, so as to allow information to be passed between the components or so as to allow the components to share and access common data. Furthermore, the components may access the one or more databases 126 via the database servers 124 (both shown in FIG. 1).

The content analysis engine 150 provides a number of content analysis features related to media products or listings, whereby the content analysis engine 150 performs content-based analysis of media products to provide recommendations to users. To this end, the content analysis engine 150 includes a media vectorization module 210, a vector combination module 220, a neighbor identification module 230, a clustering module 240, and a media recommendation module 250.

In the example embodiment, the media vectorization module 210 performs vectorization on a synopsis of a subject media product. The media vectorization module 210 performs vectorization of each of the words of the synopsis using word embedding techniques (e.g., neural language models for semantic embedding of words in vector spaces, such as with word2vec). Each word of the synopsis is converted into a word vector for that word, where each element of the word vector is a real number associated with a dictionary word of the vector. The vector combination module 220 combines the word vectors generated by the media vectorization module 210 for the synopsis words, thereby creating a media vector for the subject media product. As such, the media vector is a vectorized representation of the content of the media, via the content of the synopsis. The content analysis engine 150 may perform this vectorization for a catalog of products or listings associated with the online e-commerce system 100, and may store the media vectors with the product catalog (e.g., in the database 126).

The content analysis engine 150 analyzes a seed media product (e.g., a book or a movie) for similar media products. For example, a user may indicate interest in the seed media product through viewing, watching, or purchasing the seed media product. The seed media product includes a synopsis (e.g., stored in the database 126), for which there is an associated media vector (e.g., computed by the vector combination module 220). The neighbor identification module 230 examines the seed media product for other similar media products by comparing the seed media vector to media vectors from the product catalog. The neighbor identification module 230 finds a number of "nearest neighbors" (e.g., using k-NN, or k-Nearest Neighbors). In one example embodiment, the neighbor identification module 230 identifies R media products as nearest neighbors. The clustering module 240 then clusters the R media products and the seed media product into K clusters, where K<R. As such, most or all of the R media products are placed into one of the K clusters, including the seed media product. The media recommendation module 250 selects one or more media products from one or more of the K clusters. In some embodiments, the cluster having the seed media product is excluded from generating any recommendations (e.g., no media products in the cluster with the seed media product are recommended). In some embodiments, only one media product from a given cluster is provided as a recommendation.

Figure 3:
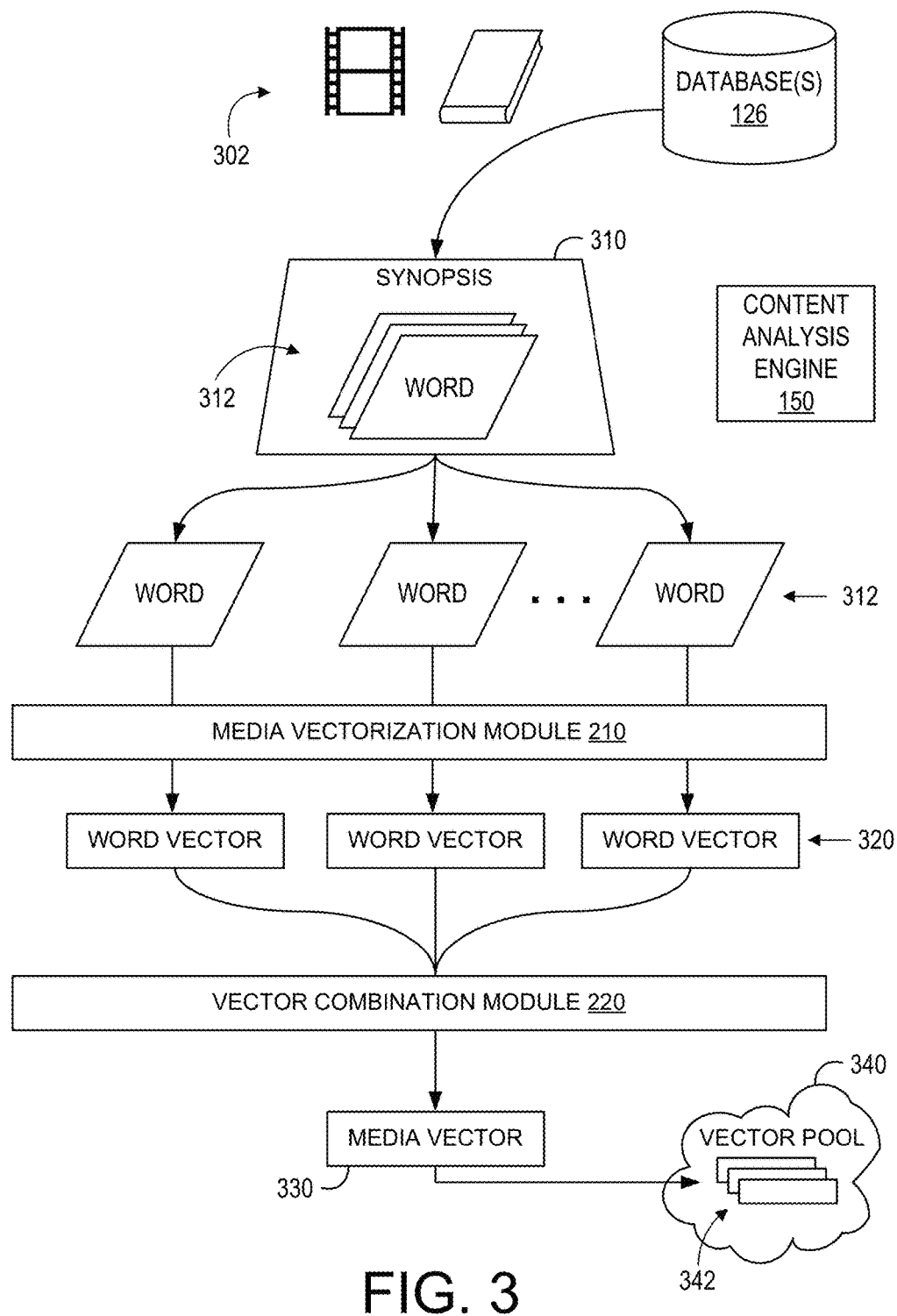
FIG. 3 illustrates the content analysis engine vectorizing words from a synopsis of a media product (e.g., a book or a movie offered for sale on the online e-commerce system shown in FIG. 1).

FIG. 3 illustrates the content analysis engine 150 vectorizing words 312 from a synopsis 310 of a media product 302 (e.g., a book or a movie offered for sale on the online e-commerce system 100). In the example embodiment, the content analysis engine 150 generates a media vector 330 for each media product 302 in a catalog of media products (not separately identified) and stores those media vectors 330 (e.g., as a pool 340 of media vectors 342) for later use in generating media recommendations. FIG. 3 shows the vectorization process for a single media product 302.

More specifically, the media product 302 includes the synopsis 310, stored in the database 126, that describes, in the words 312, a summary of the subject matter of the media product 302. For example, consider a book media product titled "Adrift: Seventy-Six Days Lost at Sea," by Steven Callahan (2002, Paperback). The synopsis for this book is:

Before *The Perfect Storm*, before *In the Heart of the Sea*, Steven Callahan's dramatic tale of survival at sea was on the *New York Times* bestseller list for more than thirty-six weeks. In some ways the model for the new wave of adventure books, *Adrift* is an undeniable seafaring classic, a riveting firsthand account by the only man known to have survived more than a month alone at sea, fighting for his life in an inflatable raft after his small sloop capsized only six days out. "Utterly absorbing" (*Newsweek*), *Adrift* is a must-have for any adventure library.

As such, the synopsis 310 includes approximately one hundred words 312.

The media vectorization module 210 vectorizes each word 312 of the synopsis 310 using semantic embeddings of words in a vector space. In the example embodiment, each word 312 is vectorized using "word2vec," a group of related models and related tools developed and promulgated by Tomas Mikolov and colleagues at Google Inc. (a California corporation). The media vectorization module 210 uses word2vec to generate a word vector 320 for each word (or "user-specified word") 312 of the synopsis 310. Each word vector 320 is a vector of elements, where each element includes a real number value. Word2vec defines the dictionary used, as well as which vector element corresponds to which word of the dictionary. Word2vec is a mapping function. A word that exists in the dictionary is mapped into a vector (e.g., the word vector 320) with a fixed size (e.g., 300 real numbers). For example, consider the words "dog", "cat", and "pen". Each of these words may be converted into a word vector, and the Euclidean distance between the two vectors may be determined and compared. Because of the similarities between "dog" and "cat" (e.g., because they are both animals), those two vectors will be closer together (e.g., a nearer or smaller Euclidean distance between the associated vectors) than, for example, "dog" and "pen" (e.g., because one is an animal and the other is a writing instrument). In some embodiments, less than all of the words of the synopsis 310 may be used (e.g., removing duplicates, ignoring articles).

Further, in the example embodiment, the media vectorization module 210 uses a pre-trained model published by Tomas Mikolov, which was trained on a part of Google News dataset (~100 billion words), and which contains 300-dimensional vectors for 3 million words and phrases. In other embodiments, the media vectorization module 210 may train a model for word2vec (e.g., from a corpus of text that includes more up-to-date data, such as data from Wikipedia). In some embodiments, the media vectorization module 210 may perform vectorization of words using GloVe, "Global Vectors for Word Representation," as developed by Jeffrey Pennington, Richard Socher, and Christopher D. Manning.

In the example embodiment, the vector combination module 220 combines the word vectors 320 to form the media vector 330 for the media product 302. In one example embodiment, the vector combination module 220 uses mean vector pooling to generate the media vector 330. This pooling technique takes a multiset of vectors, $X=\{x_1, x_2, \ldots, x_N\} \in R^D$ (e.g., where each vector x is one of the word vectors 320, R is the set of real numbers, and D is the length of the vectors, x) and computes its mean vector, v (e.g., the media vector 330), as:

$$v = \frac{1}{N} \sum_{i=1}^{N} x_i,$$

where N is the number of word vectors 320 output from the media vectorization module 210 (e.g., from the synopsis 310).

In the example embodiment, the media vector 330 is associated with the media product 302 and stored with the pool 340 of media vectors 342 in the database 126.

Figure 4:
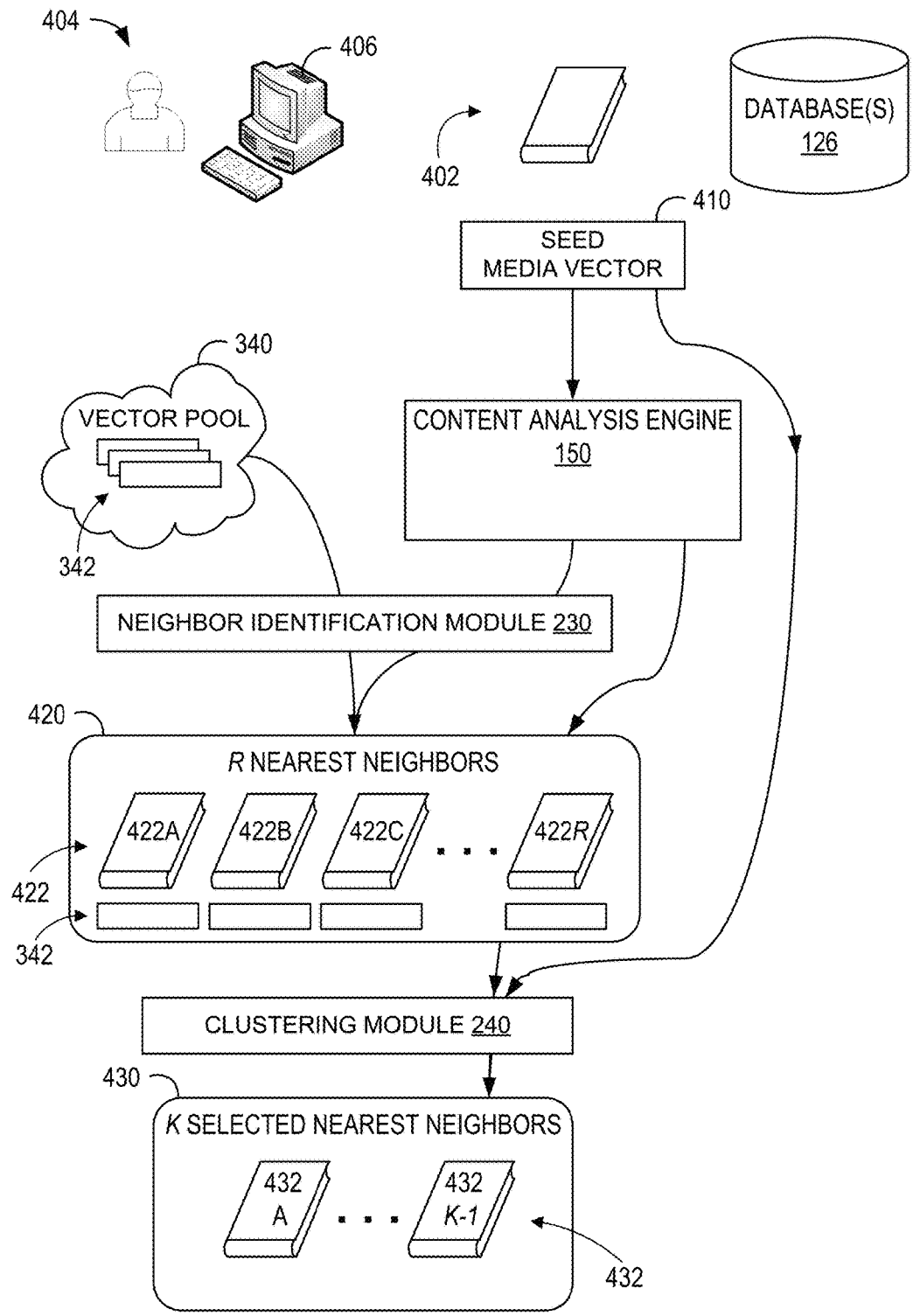
FIG. 4 illustrates components of the content analysis engine evaluating a "seed" media product of interest to a user of the online e-commerce system shown in FIG. 1 to provide a recommendation for other media products to the user.

FIG. 4 illustrates components of the content analysis engine 150 evaluating a "seed" media product 402 of interest to a user 404 of the online e-commerce system 100 to provide a recommendation for other media products to the user 404. The seed media product 402 may be similar to the media product 302. In the example embodiment, the content analysis engine 150 identifies the seed media product 402 for which the user 404 has expressed an interest (e.g., using the computing device 406, through viewing details of the seed media product 402 on the online e-commerce system 100, watching a listing associated with the seed media product 402, or purchasing the seed media product 402 on the online e-commerce system 100). The seed media product 402 is associated with a seed media vector 410 (e.g., a vector similar to the media vector 330, generated from a synopsis of the seed media product 402). In some embodiments, the seed media vector 410 may be pre-computed and retrieved from the database 126 (e.g., as described above, where the seed media vector 410 is similar to the media vector 330). In other embodiments, the content analysis engine 150 may compute the seed media vector 410 contemporaneously, and similarly to the media vector 330 (e.g., upon identification of the seed media product 402, such as at or just after the time of an online e-commerce sale).

The neighbor identification module 230 then identifies the R nearest neighbors 420 to the seed media product 402 based on the seed media vector 410 and the pool 340 of media vectors 342 (e.g., from the catalog of media products). In the example embodiment, the neighbor identification module 230 performs a brute-force nearest neighbor approach, computing a spatial Cosine distance between the seed media product 402 (i.e., the seed media vector 410) and each of the media products in the pool 340 (i.e., the media vectors 342):

$$\text{cosine}(s, t) = 1 - \frac{s \cdot t}{\|s\| \|t\|},$$

where s is the one-dimensional seed media vector 410, t is the one-dimensional media vector 342 of a catalog media product 302, and s·t is the dot product of vectors s and t.

Once cosine distances are computed for each pair, the neighbor identification module 230 identifies the R nearest neighbors to the seed media vector 410 (e.g., the R media vectors 342 having the lowest cosine distance). In some embodiments, R is a predetermined number, such as fifty.

In some embodiments, the media recommendation module 250 may select one or more of the media products 422 from the R nearest neighbors 420 and make a recommendation for those media products 422 to the user 404 (e.g., at or after an online sale of the seed media product 402 to the user 404).

In the example embodiment shown in FIG. 4, once the R nearest neighbor 420 media products 422 are identified, the clustering module 240 performs clustering on those media products 422. More specifically, in one example embodiment, the clustering module 240 performs k-means clustering to partition the R nearest neighbors 420, and optionally also the seed media vector 410, into K clusters (not separately depicted), where K<R. As such, each of the K clusters contains one or more media vectors 342, 410. In some embodiments, the media recommendation module 250 selects one media product 432 from each cluster (e.g., randomly, or the media product 432 having the closest cosine distance to the seed media product 402). Selecting only one media product 432 from each of the K clusters may reduce the chances of providing recommendations for the same or very similar products to the user 404. For example, clustering enables the content analysis engine 150 to possibly avoid recommending two different versions of the same book, as the synopses of the two versions may be similar or identical and, as such, they are likely to end up in the same cluster. In some embodiments, the media product 432 selected from each cluster is determined as the media product 432 that was listed the most in the last year. As such, the media product 432 is more likely to have inventory on the online e-commerce system 100. In some embodiments, the media recommendation module 250 may exclude the cluster that includes the seed media product 402. Similarly, and for example, excluding the cluster in which the seed media product 402 occurs enables the content analysis engine 150 to possibly avoid recommending a different version of the seed media product 402 to the user 404, as the two versions are likely to end up in the same cluster.

In some embodiments, the media products 422 or 432 are pre-computed by the content analysis engine 150 for each seed media product 402 (e.g., "catalog book") in a catalog of media products (e.g., via offline or batch processing). In other words, the recommendations for each seed media product 402 may be predetermined such that, at the time a seed media product 402 is identified (e.g., by the user 404 purchasing the seed media product 402), the content analysis engine 150 may retrieve the recommended media products 422 or 432 for that seed media product 402 from the database 126. As such, recommendation processing times may be decreased (e.g., only a lookup, rather than real-time processing), thereby improving the operation of the computer.

In some embodiments, the processing steps are performed using distributed processing. The content analysis engine 150 may employ MapReduce in order to execute the feature extraction and pooling steps (e.g., as shown and described relative to FIG. 3). The descriptions of the media products 302 may be stored in a Hadoop distributed file system (HDFS) as a table of (product-id, description). A Hadoop job is splitting the description of each product into tokens of unigrams, bigrams, and trigrams, and storing the results in a table, productToToken, of (product-id, token). The tokens and embeddings of the word2vec model are also stored in a table, tokenToVec, of (token, tokenVec). Storing the tokens and their embeddings in a table instead of in memory allows the Hadoop job to run using many simple machines with a low amount of memory. Another Hadoop job joins the productToToken table with the tokenToVec table, resulting in a new table, productToTokenVec, of (product-id, tokenVec). Another Hadoop job is implementing the pooling and converting the productToTokenVec table into a table, productToRepresentation of (product-id, representation). The GPU brute force nearest neighbor search reads the productToRepresentation table, performs the exact search, and outputs a table, productToCandidates, of (product-id, candidates-products), where the candidates-products field contains a list of the M exact nearest neighbors of the product-id. The diversification step is implemented by another Hadoop job that reads both the productToCandidates and productToRepresentation tables and creates a table, productToRecommendations, of (product-id, recommendations), where the recommendations field contains the final K recommendations that will be presented to the user 404.

Figure 5:
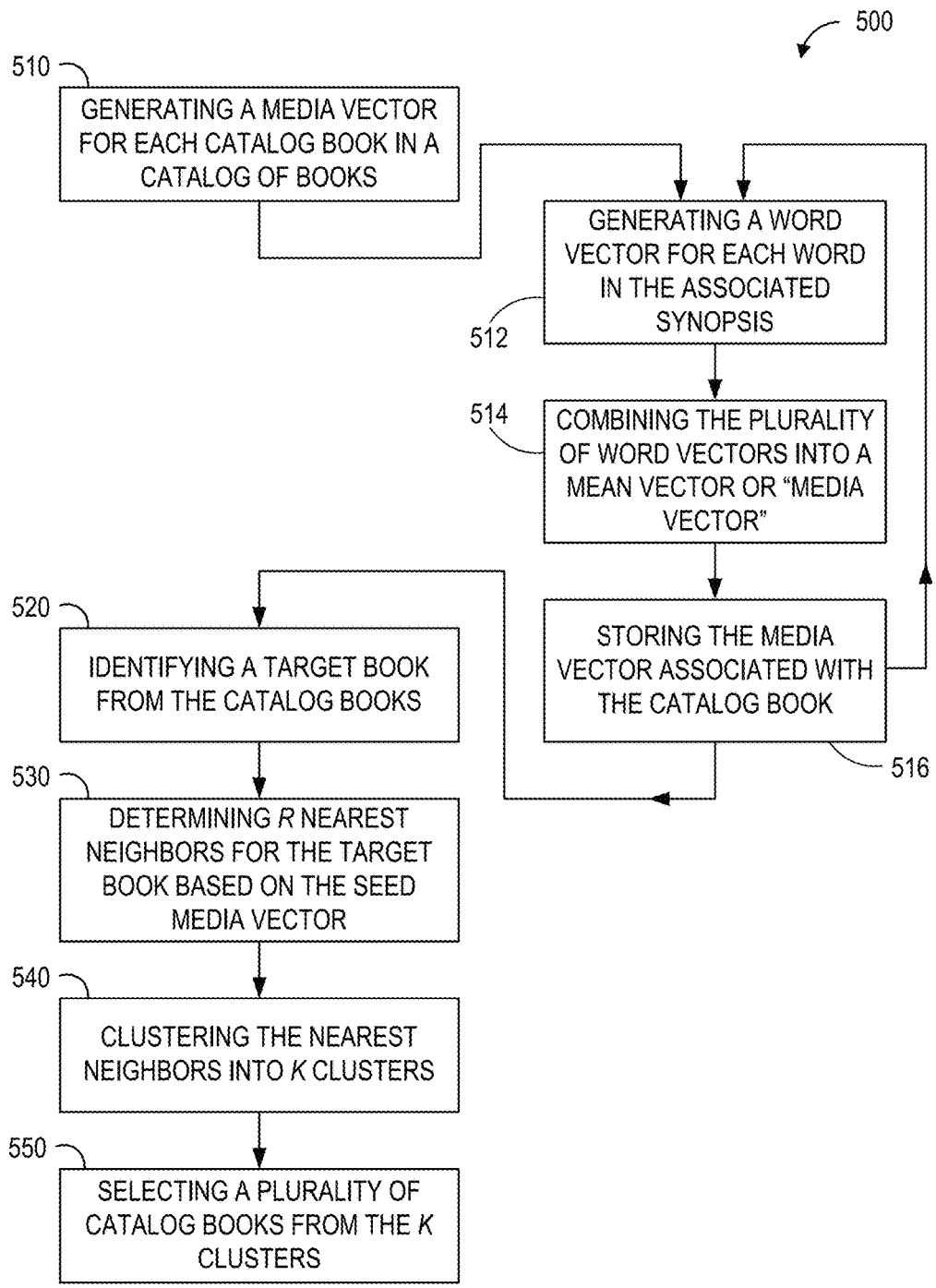
FIG. 5 illustrates a computerized method, in accordance with an example embodiment, for content-based media analysis.

FIG. 5 illustrates a computerized method 500, in accordance with an example embodiment, for content-based media analysis. The computerized method 500 is performed by a computing device comprising at least one processor and a memory. In the example embodiment, at operation 510, the computerized method 500 includes generating a media vector for each catalog book of a plurality of catalog books based on an associated synopsis, each catalog book including the associated synopsis. For each catalog book, the operation 510 includes operation 512 for generating a word vector for each word of a plurality of words in the associated synopsis, thereby generating a plurality of word vectors, operation 514 for combining the plurality of word vectors into a mean vector, the mean vector being the media vector, and operation 516 for storing the mean vector, in the memory, as the media vector associated with the catalog book. In some embodiments, generating the word vector for each word of the plurality of words in the associated synopsis at operation 512 comprises generating the word vector using word2vec. In some embodiments, the associated synopsis includes N words, the plurality of word vectors includes a multiset of word vectors, X, of N word vectors $\{x_1, x_2, \ldots, x_N\}$, and combining the plurality of word vectors into a mean vector, v, at operation 514 includes computing:

$$v = \frac{1}{N} \sum_{i=1}^{N} x_i,$$

At operation 520, the method 500 also includes identifying a target book from the plurality of catalog books, the target book associated with a seed media vector. At operation 530, the method 500 further includes determining R nearest neighbors for the target book from the plurality of catalog books based on the seed media vector and the media vectors associated with the plurality of catalog books. In some embodiments, the method 500 further includes generating a media vector for each catalog movie of a plurality of catalog movies based on an associated synopsis of each catalog movie, wherein determining the R nearest neighbors for the target book further includes identifying the R nearest neighbors from the plurality of catalog movies, further based on the media vectors associated with the plurality of catalog movies.

At operation 540, the method 500 also includes clustering the R nearest neighbors for the target book into K clusters. At operation 550, the method 500 further includes selecting a plurality of catalog books from the K clusters for recommendation to a user. In some embodiments, the method 500 further includes clustering the seed media vector into a seed cluster, the seed cluster being one of the K clusters, wherein selecting the plurality of catalog books from the K clusters excludes the seed cluster.

In some embodiments, the method 500 also includes computing a cosine distance, cosine(s,t), between each pairing of the seed media vector, s, and the associated media vector, t, of each catalog book of the plurality of catalog books:

$$\text{cosine}(s, t) = 1 - \frac{s \cdot t}{\|s\| \|t\|},$$

wherein s·t is the dot product of vectors s and t, thereby generating an associated cosine distance for each catalog book of the plurality of catalog books, and determining the R nearest neighbors for the target book from the plurality of catalog books further based on the associated cosine distance for each catalog book of the plurality of catalog books. In some embodiments, the method 500 also includes selecting one catalog book from each of the K clusters.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 6:
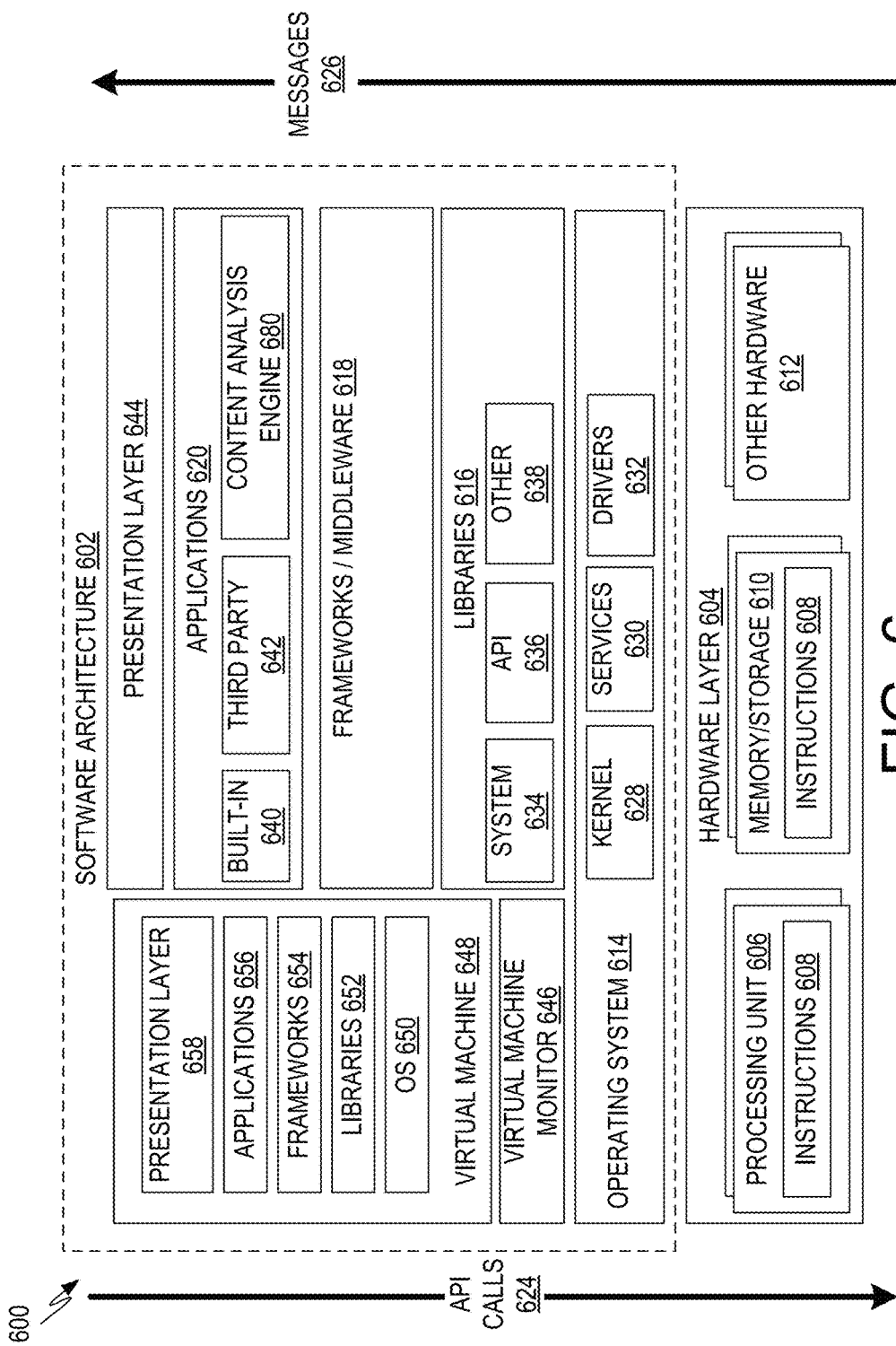
FIG. 6 is a block diagram illustrating an example software architecture, which may be used, in conjunction with various hardware architectures herein described, to perform content-based media analysis (e.g., on the online e-commerce system shown in FIG. 1).

FIG. 6 is a block diagram 600 illustrating an example software architecture 602, which may be used, in conjunction with various hardware architectures herein described, to perform content-based media analysis (e.g., on the online e-commerce system 100). A content analysis engine 680, which is shown in a laywer of applications 620, may be similar to the content analysis engine 150, but may be provided in whole or in part at other layers shown in FIG. 6. FIG. 6 is a non-limiting example of a software architecture 602, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 having associated executable instructions 608. The executable instructions 608 represent the executable instructions of the software architecture 602, including implementation of the methods, modules, and so forth described herein. The hardware layer 604 also includes memory/storage 610, which also includes the executable instructions 608. The hardware layer 604 may also comprise other hardware 612.

In the example architecture of FIG. 6, the software architecture 602 may be conceptualized as a stack of layers where each layer provides particular functionality. For example, the software architecture 602 may include layers such as an operating system 614, libraries 616, frameworks or middleware 618, applications 620, and a presentation layer 644. Operationally, the applications 620 and/or other components within the layers may invoke application programming interface (API) calls 624 through the software stack and receive a response as messages 626. The layers illustrated are representative in nature and not all software architectures 602 have all layers. For example, some mobile or special purpose operating systems 614 may not provide the frameworks/middleware 618, while others may provide such a layer. Other software architectures 602 may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than by interfacing directly with the underlying operating system 614 functionality (e.g., kernel 628, services 630, and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) provide a higher-level common infrastructure that may be used by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system 614 or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. The third-party applications 642 may include an application developed using the Android™ or iOS™ software development kit (SDK) by an entity other than the vendor of the particular platform, and may be mobile software running on a mobile operating system 614 such as iOS™, Android™, Windows® Phone, or other mobile operating systems 614. The third-party applications 642 may invoke the API calls 624 provided by the mobile operating system, such as the operating system 614, to facilitate functionality described herein.

The applications 620 may use built-in operating system functions (e.g., kernel 628, services 630, and/or drivers 632), libraries 616, or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures 602 use virtual machines. In the example of FIG. 6, this is illustrated by a virtual machine 648. The virtual machine 648 creates a software environment where applications/modules can execute as if they were executing on a hardware machine (such as the machine 700 of FIG. 7, for example). The virtual machine 648 is hosted by a host operating system (e.g., operating system 614) and typically, although not always, has a virtual machine monitor 646, which manages the operation of the virtual machine 648 as well as the interface with the host operating system (i.e., operating system 614). A software architecture executes within the virtual machine 648, such as an operating system (OS) 650, libraries 652, frameworks 654, applications 656, and/or a presentation layer 658. These layers of software architecture executing within the virtual machine 648 can be the same as corresponding layers previously described or may be different.

Figure 7:
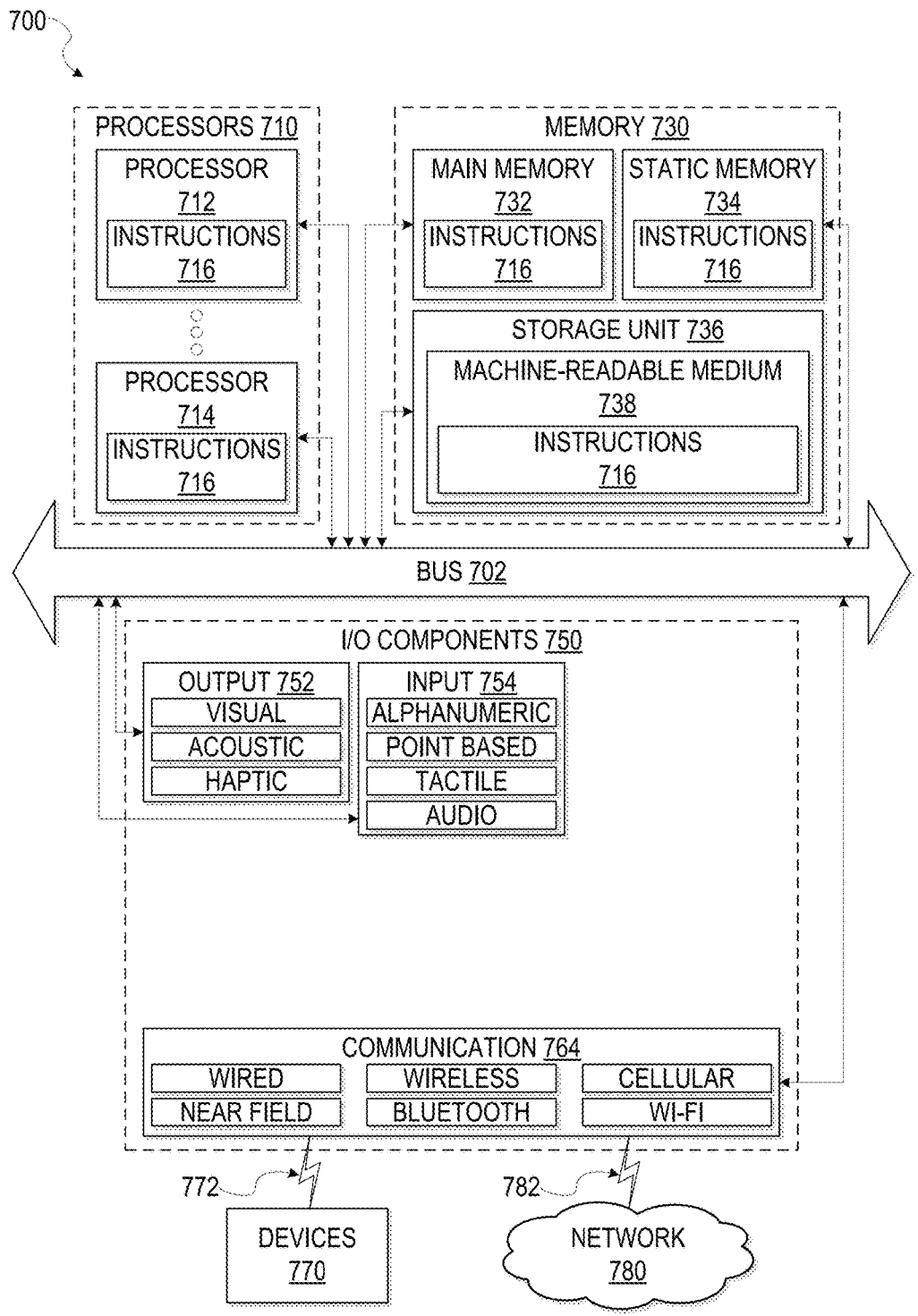
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 700, according to some example embodiments, configured to read instructions 716 from a machine-readable medium 738 (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions 716 transform the general, non-programmed machine 700 into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and input/output (I/O) components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a GPU, a digital signal processor (DSP), an ASIC, a radio-frequency integrated circuit (RFIC), another processor, or any suitable combination thereof) may include, for example, a processor 712 and a processor 714 that may execute the instructions 716. The term "processor" is intended to include a multi-core processor 712 that may comprise two or more independent processors 712, 714 (sometimes referred to as "cores") that may execute the instructions 716 contemporaneously. Although FIG. 7 shows multiple processors 712, 714, the machine 700 may include a single processor 712 with a single core, a single processor 712 with multiple cores (e.g., a multi-core processor), multiple processors 712, 714 with a single core, multiple processors 712, 714 with multiples cores, or any combination thereof.

The memory/storage 730 may include a memory, such as a main memory 732, a static memory 734, or other memory, and a storage unit 736, both accessible to the processors 710 such as via the bus 702. The storage unit 736 and memory 732, 734 store the instructions 716 embodying any one or more of the methodologies or functions described herein. The instructions 716 may also reside, completely or partially, within the memory 732, 734, within the storage unit 736, within at least one of the processors 710 (e.g., within the processor's cache memory), or any suitable combination thereof, during execution thereof by the machine 700. Accordingly, the memory 732, 734, the storage unit 736, and the memory of the processors 710 are examples of machine-readable media 738.

As used herein, "machine-readable medium" means a device able to store the instructions 716 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 750 may include a wide variety of components to receive input, provide output, produce output, transmit information, exchange information, capture measurements, and so on. The specific I/O components 750 that are included in a particular machine 700 will depend on the type of machine. For example, portable machines 700 such as mobile phones will likely include a touch input device or other such input mechanisms, while a headless server machine 700 will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772 respectively. For example, the communication components 764 may include a network interface component or other suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine 700 or any of a wide variety of peripheral devices (e.g., a peripheral device coupled via a USB).

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A media analysis system comprising:
one or more hardware processors;
a memory storing synopses associated with a plurality of catalog books, each catalog book in the plurality of catalog books including a different synopsis; and
a content analysis engine, executable by the one or more hardware processors, configured to perform operations comprising:
generating a different media vector for each catalog book of the plurality of catalog books based on the synopsis of the catalog book, the generating comprising:
generating a word vector for each word of a plurality of words in the synopsis of the catalog book, thereby generating a plurality of word vectors;
combining the plurality of word vectors into a mean vector for the catalog book, the mean vector being the media vector; and
storing the mean vector, in the memory, as the media vector associated with the catalog book;
identifying a target book, the target book associated with a seed media vector;
determining R nearest neighbors for the target book from the plurality of catalog books based on (1) the seed media vector and (2) the media vectors associated with the plurality of catalog books;
clustering the R nearest neighbors for the target book into K clusters; and
selecting a second plurality of catalog books for recommendation to a user based on the K clusters.

2. The media analysis system of claim 1, wherein generating the word vector for each word of the plurality of words in the synopsis of the catalog book comprises generating the word vector using word2vec.

3. The media analysis system of claim 1,
wherein the synopsis of the catalog book includes N words,
wherein the plurality of word vectors includes a multiset of word vectors, X, of N word vectors $\{x_1, x_2, \ldots, x_N\}$, and
wherein combining the plurality of word vectors into the mean vector, v, comprises computing:

$$v = \frac{1}{N} \sum_{i=1}^{N} x_i.$$

4. The media analysis system of claim 1, wherein the content analysis engine is further configured to perform operations comprising:
computing a cosine distance, cosine(s,t), between each pairing of the seed media vector, s, and the associated media vector, t, of each catalog book of the plurality of catalog books:

$$\operatorname{cosine}(s, t) = 1 - \frac{s \cdot t}{\|s\| \|t\|},$$

wherein s·t is the dot product of the vectors s and t, thereby generating an associated cosine distance for each catalog book of the plurality of catalog books; and
determining the R nearest neighbors for the target book from the plurality of catalog books further based on the associated cosine distance for each catalog book of the plurality of catalog books.

5. The media analysis system of claim 1, wherein the content analysis engine is further configured to perform operations comprising selecting one catalog book from each of the K clusters.

6. The media analysis system of claim 1, wherein the content analysis engine is further configured to perform operations comprising:
clustering the seed media vector into a seed cluster, the seed cluster being one of the K clusters,
wherein selecting the second plurality of catalog books based on the K clusters excludes the seed cluster.

7. The media analysis system of claim 1, wherein the content analysis engine is further configured to perform operations comprising:
generating a media vector for each catalog movie of a plurality of catalog movies based on an associated synopsis of each catalog movie,
wherein determining the R nearest neighbors for the target book further includes identifying the R nearest neighbors from the plurality of catalog movies, and further based on the media vectors associated with the plurality of catalog movies.

8. A computer-implemented method for content-based media analysis, the method comprising:
generating a different media vector for each catalog book of a plurality of catalog books based on a synopsis of the catalog book, the generating comprising:

generating a word vector for each word of a plurality of
words in the synopsis of the catalog book, thereby
generating a plurality of word vectors;
combining the plurality of word vectors into a mean
vector for the catalog book, the mean vector being
the media vector; and
storing the mean vector, in a memory, as the media
vector associated with the catalog book;
identifying a target book, the target book associated with
a seed media vector;
determining R nearest neighbors for the target book from
the plurality of catalog books based on (1) the seed
media vector and (2) the media vectors associated with
the plurality of catalog books;
clustering the R nearest neighbors for the target book into
K clusters; and
selecting a second plurality of catalog books for recommendation to a user based on the K clusters.

9. The method of claim 8, wherein generating the word vector for each word of the plurality of words in the synopsis of the catalog book comprises generating the word vector using word2vec.

10. The method of claim 8,
wherein the synopsis of the catalog book includes N words,
wherein the plurality of word vectors includes a multiset of word vectors, X, of N word vectors $\{x_1, x_2, \ldots, x_N\}$, and
wherein combining the plurality of word vectors into the mean vector, v, includes computing:

$$v = \frac{1}{N}\sum_{i=1}^{N} x_i.$$

11. The method of claim 8, further comprising:
computing a cosine distance, cosine(s,t), between each pairing of the seed media vector, s, and the associated media vector, t, of each catalog book of the plurality of catalog books:

$$\mathrm{cosine}(s, t) = 1 - \frac{s \cdot t}{\|s\|\|t\|},$$

wherein s·t is the dot product of the vectors s and t, thereby generating an associated cosine distance for each catalog book of the plurality of catalog books; and
determining the R nearest neighbors for the target book from the plurality of catalog books further based on the associated cosine distance for each catalog book of the plurality of catalog books.

12. The method of claim 8, further comprising selecting one catalog book from each of the K clusters.

13. The method of claim 8, further comprising:
clustering the seed media vector into a seed cluster, the seed cluster being one of the K clusters,
wherein selecting the second plurality of catalog books based on the K clusters excludes the seed cluster.

14. The method of claim 8, further comprising:
generating a media vector for each catalog movie of a plurality of catalog movies based on an associated synopsis of each catalog movie,
wherein determining the R nearest neighbors for the target book further includes identifying the R nearest neighbors from the plurality of catalog movies, and further based on the media vectors associated with the plurality of catalog movies.

15. A non-transitory machine-readable medium storing processor-executable instructions which, when executed by a processor, cause the processor to:
generate a different media vector for each catalog book of a plurality of catalog books based on a synopsis of the catalog book, the generating comprising:
generating a word vector for each word of a plurality of words in the synopsis of the catalog book, thereby generating a plurality of word vectors;
combining the plurality of word vectors into a mean vector for the catalog book, the mean vector being the media vector; and
storing the mean vector, in a memory, as the media vector associated with the catalog book;
identify a target book, the target book is associated with a seed media vector;
determine R nearest neighbors for the target book from the plurality of catalog books based on (1) the seed media vector and (2) the media vectors associated with the plurality of catalog books;
cluster the R nearest neighbors for the target book into K clusters; and
select a second plurality of catalog books for recommendation to a user based on the K clusters.

16. The machine-readable medium of claim 15,
wherein the synopsis of the catalog book includes N words,
wherein the plurality of word vectors includes a multiset of word vectors, X, of N word vectors $\{x_1, x_2, \ldots, x_N\}$, and
wherein combining the plurality of word vectors into the mean vector, v, includes computing:

$$v = \frac{1}{N}\sum_{i=1}^{N} x_i.$$

17. The machine-readable medium of claim 15, wherein the processor-executable instructions further cause the processor to:
compute a cosine distance, cosine(s,t), between each pairing of the seed media vector, s, and the associated media vector, t, of each catalog book of the plurality of catalog books:

$$\mathrm{cosine}(s, t) = 1 - \frac{s \cdot t}{\|s\|\|t\|},$$

wherein s·t is the dot product of the vectors s and t, thereby generating an associated cosine distance for each catalog book of the plurality of catalog books; and
determine the R nearest neighbors for the target book from the plurality of catalog books further based on the associated cosine distance for each catalog book of the plurality of catalog books.

18. The machine-readable medium of claim 15, wherein the processor-executable instructions further cause the processor to select one catalog book from each of the K clusters.

19. The machine-readable medium of claim 15, wherein the processor-executable instructions further cause the processor to:

cluster the seed media vector into a seed cluster, the seed cluster being one of the K clusters,
wherein selecting the second plurality of catalog books based on the K clusters excludes the seed cluster.

20. The machine-readable medium of claim 15, wherein the processor-executable instructions further cause the processor to:
generate a media vector for each catalog movie of a plurality of catalog movies based on an associated synopsis of each catalog movie,
wherein determining the R nearest neighbors for the target book further includes identifying the R nearest neighbors from the plurality of catalog movies, and further based on the media vectors associated with the plurality of catalog movies.

* * * * *